United States Patent [19]

Hähn et al.

[11] Patent Number: 5,648,306

[45] Date of Patent: Jul. 15, 1997

[54] PROCESS FOR PRODUCING SORBENTS BASED ON SMECTITES TO ABSORB LIQUIDS

[75] Inventors: Reinhard Hähn, Vilsheim; Otto Haubensak, Brannenburg; Max Eisgruber, Bruckberg, all of Germany

[73] Assignee: Sud-Chemie AG, Munich, Germany

[21] Appl. No.: 481,364

[22] PCT Filed: Nov. 10, 1994

[86] PCT No.: PCT/EP94/03723

§ 371 Date: Oct. 2, 1995

§ 102(e) Date: Oct. 2, 1995

[87] PCT Pub. No.: WO95/13134

PCT Pub. Date: May 18, 1995

[30] Foreign Application Priority Data

Nov. 10, 1993 [DE] Germany .................. 43 38 362.9

[51] Int. Cl.⁶ .................. B01J 21/16; B01J 20/00
[52] U.S. Cl. .................. 502/80; 502/400; 502/407; 119/172; 119/173
[58] Field of Search .................. 502/400, 407, 502/80; 119/172, 173

[56] References Cited

U.S. PATENT DOCUMENTS

| | | | |
|---|---|---|---|
| 4,163,674 | 8/1979 | Been .................. | 106/15.05 |
| 4,343,751 | 8/1982 | Kumar .................. | 264/37 |
| 4,570,573 | 2/1986 | Lohman .................. | 119/1 |
| 4,615,923 | 10/1986 | Marx .................. | 428/35 |
| 4,686,937 | 8/1987 | Rosenfeld .................. | 119/1 |
| 4,925,826 | 5/1990 | Hamm et al. .................. | 502/407 |
| 5,062,383 | 11/1991 | Nelson .................. | 119/173 |
| 5,183,064 | 2/1993 | House .................. | 119/172 |

FOREIGN PATENT DOCUMENTS

| | | |
|---|---|---|
| 0515959 | 10/1991 | European Pat. Off. . |
| 3816225 | 3/1982 | Germany . |
| 3825905 | 11/1986 | Germany . |
| 3728812 | 4/1987 | Germany . |
| 4028933 | 4/1992 | Germany . |
| 4101243 | 11/1992 | Germany . |
| 3644826 | 2/1993 | Germany . |
| 8600496 | 2/1991 | WIPO . |

*Primary Examiner*—Glenn A. Caldarola
*Assistant Examiner*—In Suk Bullock
*Attorney, Agent, or Firm*—Scott R. Cox

[57] ABSTRACT

A process for producing sorbents based on smectites for absorbing liquids is described. This process is characterized in that a) a smectite with a water content of less than 6% by weight;

b) a wet mass of fibrous cellulose and inorganic pigments which forms in the treatment of waste water from paper manufacture; and c) anhydrous calcium sulfate (anhydrite) or calcium sulfate hemihydrate are mixed with one another, compressed and crushed. The quantitative ratio between the smectite (a), the wet mass (b) and calcium sulfate (c) are selected such that the water content (free water) of the granular material is less than 20% by weight.

18 Claims, No Drawings

PROCESS FOR PRODUCING SORBENTS BASED ON SMECTITES TO ABSORB LIQUIDS

BACKGROUND OF THE INVENTION

The invention relates to a process for producing sorbents based on smectites for absorbing liquids. While these sorbents are suitable for absorbing any liquids; they are especially suited as litter for pets.

Keeping pets in a largely urbanized environment increasingly requires the use of litters. Litter is designed to absorb the liquids released by the animals and in doing so to diminish or prevent the development of odor as much as possible. Furthermore, it is designed to remove moisture from the semisolid, wet animal excrement and excretions to reduce or prevent odor development. Good litters moreover have the property of absorbing the released or removed liquids while forming compact lumps which can be easily and economically removed. Thus, an optimum animal litter has high absorbency.

Products currently found on the market include organic substances such as straw, sawdust, wood shavings, bark, porous plastic beads, shredded paper, cellulose fibers, agricultural waste, polyacrylates, etc. They are used alone or in combinations with inorganic materials. The disadvantage of the organic litters is often unsatisfactory lump formation or their consistency and their tendency to bacterial decomposition, especially in interaction with moisture.

On the other hand, DE-A-3 816 225 discloses litters which bind odor and moisture, especially for small animals, with a cellulose-containing material. The cellulose-containing material as a wet substance is mixed at least with a capillary-active, small-grain material with a grain size of less than 0.5 mm, in a weight ratio of 90:10 to 20:8. For example, the wet mass (recovered paper stock) which is formed from the treatment of waste waters of paper manufacture with a moisture content of 50 to 60% by weight can be used as the cellulose-containing material. As the capillary-active material, for example, bentonite can be used which in its untreated state has a moisture content of roughly 30% by weight. However pumice powder with a moisture content of at most 30% by weight is preferred. The resulting litter must be dried; which is very energy-intensive.

DE-A-37 28 812 and DE-C-38 25 905 disclose sorbents based on clays and clay minerals with a content of a mineral from the group of smectites which are sintered at temperatures of more than 650° C. to achieve a high pore volume. Organic substances such as sawdust, cork, rice husks or the like can be added as porosity-enhancing agents. These porosity-enhancing agents however are burned out during heating and no longer remain in the product. The material obtained after burning no longer swells.

U.S. Pat. No. 5,188,064 discloses a process for improving the sorption capacity of swellable smectite clays with a particle size of at least 95%<200 microns. This clay is mixed with a particulate cellulose-containing material with a particle size of at least 95%<2000 microns. The weight ratio between the cellulose-containing material and smectite is roughly 0.05 to 3:1. Components can be mixed with one another either dry or wet. The mixture obtained after the drying process is extremely dusty. The cellulose component is not bound to the product so that the material tends to adhere strongly to animal fur and paws. This mixture cannot be used as litter. The mixture obtained after the wetting process has a higher density and lower sorption capacity compared to a wet kneaded mixture.

DE-C-3 034 169 discloses a water absorbing insert for food packages which contains, in a bag of a water-permeable film, a mixture of diatomaceous earth and an organic gel-forming agent such as carboxymethyl cellulose, cellulose ether, polyvinyl pyrolidone, starch, dextrose, gelatin and/or pectin. The mixture contains neither smectite nor calcium sulfate.

WO 86/00496 discloses a sorbent which is suitable as litter for pets and which is produced by mixing clay with cellulose-containing material such as rice husks or wheat bran, pelletizing the mixture, drying and heating the pellets to a temperature from 550° to 1100° C. At these temperatures the cellulose-containing material is burned. Moreover, the sorbent contains no gypsum.

DE-A4 028 933 discloses a process for producing a material for absorbing liquids, especially animal excrement, in which cellulose materials as fillers are first crushed coarsely and then finely until they have a wadding-like form. Thereafter they are mixed and pressed dry with a clay powder. The clay powder is obtained essentially from alumina minerals based on kaolinite and quartz. The material contains no gypsum.

DE-A4 101 243 discloses an animal litter and a process for its manufacture in which a cellulose material is mixed with weighting materials, thickeners and/or binders as well as water. The product is then dewatered, crushed and dried. The cellulose material can comprise, for example, wood, wood products, residues from wood processing and straw. Thickeners, for example, silicic acid, silicate materials, zeolite, bentonite and polyacrylates can also be used. No water content is indicated for the bentonite.

DE-A-3 644 826 discloses a material for absorbing liquids, especially an animal litter, which is characterized by a mixture of fillers, gypsum and accelerators. The fillers can consist of cellulose, especially waste paper and/or textile materials. As accelerators, gypsum or mixtures of gypsum and other inorganic sulfates can be used. The disadvantage of this process is that the cellulose-containing material must be dried beforehand and converted into a wadding-like form in an expensive process step.

An absorption material for liquids based on sewage sludge from the paper industry is produced according to EP-A-0 115 898 and EP 0 169 946. This sewage sludge, which contains cellulose fibers and inorganic pigments, is mixed with a surface-active component, dewatered, granulated, screened and dried to a water content from 2 to 5% by weight. The drying process is relatively expensive and undesirable due to the danger of fire. Moreover, in contact with moisture, the material does not form lumps.

U.S. Pat. No. 4,570,573 discloses a cat litter which contains roughly 60 to 94% by weight of an absorption agent, roughly 1 to 35% by weight of gypsum, and roughly 3 to 12% by weight water. Clay and paper can be used as the absorption agent. The gypsum is present in the form of a calcium sulfate dihydrate which is weakly acid and which reacts with urea to form a urea sulfate salt. Clay is generally defined as a material which contains kaolin as its main component.

The object of the invention is a process for producing sorbents based on smectites for absorbing liquids, in which as high a proportion as possible of wet recovered paper stock can be used without the product then needing to be dried to increase sorption capacity.

SUMMARY OF THE INVENTION

This object is achieved by mixing the following with one another:

a) a smectite with a water content of less than 6% by weight;
b) a wet mass of fibrous cellulose and inorganic pigments which forms in the treatment of waste water from paper manufacture; and
c) anhydrous calcium sulfate (anhydrite) or calcium sulfate hemihydrate compressing and crushing the mixture, wherein the quantitative ratio between the smectite (a), the wet mass (b) and calcium sulfate product (c) are selected such that the water content (free water) of the granular material is less than about 20% by weight.

DESCRIPTION OF INVENTION

"Compressing" according to the invention is defined as compaction, for example briquetting, pelletizing or tabletting, in contrast to molding in the plastic state, for example, by extrusion.

The resulting granular material is solid and has a water absorbency of greater than 100%, preferably greater than 120%. One method for determining water absorbency is disclosed below. There is also disclosed a method for determining the water content of the smectite used as the raw material and of the paper mass, as well as a method for determining the water content of the granular material.

The smectite (a), the wet mass (b) and calcium sulfate (c) are preferably blended with one another by intensive mixing. Energy consumption in blending is generally 30 to 100, preferably 50 to 80 Wh/kg of mixture.

A forced mixer (for example, a mixer from the company Eirich) is preferably used for blending. Subsequently the mixture is compacted in a compactor (for example, a compactor from the company Bepex) at a pressure of roughly 120 to 200 kN. This yields pieces with dimensions length=6 to 200 mm, width=2 to 6 mm, and height=4 to 5 mm. These products are then crushed into a granular material, from about 0.1 to 10 mm, preferably from about 1 to 5 mm, in size.

The wet mass of fibrous cellulose and inorganic pigments which is formed in treatment of waste water from paper manufacture contains predominantly fibrous cellulose portions and 10 to 30% by weight inorganic pigments, such as calcium carbonate, kaolin and $TiO_2$, as well as other pigments used in paper manufacture. The proportions are each referenced to the dry mass. When it is used, the wet mass (b) has a water content from 30 to 60, preferably from 40 to 50% by weight, most preferably 45% by weight.

Preferably the ratio between the smectite (a), wet mass (b) and calcium sulfate (c) relative to the respective dry mass is set at 2 to 6:1:0.5 to 3, especially 2.5 to 3.5:1:1 to 2.

The smectite, preferably an alkali earth bentonite or alkali bentonite, which is used in its originally mined state has a moisture content of roughly 30%. The bentonite can be dried more easily than the wet mass (b) since drying of the latter can result in an explosion because drying dust develops. In addition, drying of the wet mass (b) is expensive since it does not flow easily.

The smectite is dried preferably by exposing the material to be dried to not more than 150° C., preferably not more than 120° C. In drying at higher temperatures, a reduction of the sorption capacity of the smectite can occur.

The anhydrous calcium sulfate ($CaSO_4$) or the calcium sulfate hemihydrate ($CaSO_4 \times \frac{1}{2} H_2O$) absorbs moisture from the wet mass (b) and in doing so is at least partially converted into calcium sulfate dihydrate ($CaSO_4 \times 2H_2O$). In this way the free water is removed from the system without the need to dry the product. The calcium sulfate dihydrate furthermore represents a binder for the other components, i.e., a solid granular material is obtained which during packaging, shipping and use does not develop dust.

An anhydrous calcium sulfate or calcium sulfate hemihydrate obtained from natural gypsum or industrial gypsum can be used, preferably industrial gypsum is used as the raw material for reasons of economy. It is formed, for example, in flue gas desulfurization and can only be dumped in many cases. When anhydrous calcium sulfate is used, generally fine grinding and the addition of activators (for example, combinations of alkali sulfates and calcium hydroxide) are necessary.

The subject matter of the invention is furthermore a sorbent which can be obtained according to the above-described process in granular form, which contains a smectite (a), a wet mass (b) of fibrous cellulose and inorganic pigments, and calcium sulfate (c) in hydrated form (preferably as calcium sulfate dihydrate), wherein the moisture content (free water) of the granular material is not more than 20% by weight.

The water bound in the hydrated calcium sulfate (crystal water) is not included in the calculation relative relationship among the components of the sorbent.

Preferably the sorbent contains 38 to 71, especially 49 to 60% by weight smectite (a) (relative to dry substance), 9 to 24, especially 13 to 19% by weight of mass (b) (relative to dry substance), (c) 5 to 30, especially 10 to 20% by weight calcium sulfate dihydrate, (d) and 5 to 20, especially 10 to 15% by weight free water.

The sorbent according to the invention can furthermore be blended with known sorbents, for example, organic sorbents. Furthermore, the sorbent can contain white pigments, disinfectants and/or animal acceptance agents.

The subject matter of the invention is further the use of the aforementioned sorbent as a packing material, absorption agents for liquids (for example, body fluids, oil, liquid chemicals) and as litter for pets, especially as cat litter.

The water content of the smectite used according to the invention is determined as follows:

Ten grams of smectite are accurately weighed in a flat tray and heated at 105° C. until the weight is constant (at least 2 hours). Then the sample is cooled in a desiccator to room temperature and weighed:

Evaluation:
$$\frac{\text{Initial weight} - \text{final weight}}{\text{Initial weight}} \times 100 = \text{water content}$$

The water content (free water) of the sorbent according to the invention is determined similarly to the water content of the smectite. Heating takes place at 105° C. until the weight is constant. At this temperature the hydrated calcium sulfate no longer yields water. The water content of the wet mass (b) is determined in a corresponding manner (drying at 105° C. until the weight is constant).

The water absorbency of the sorbent according to the invention is determined according to the Westinghouse method (No. 17-A) (Compare Industrial Minerals, August 1992, page 57). In this case the sorbent, which has been dried to a residual water content of 6% by weight, is weighed into a conical container of fine wire gauze (clear mesh width 0.25 mm=60 mesh, diameter 7 cm, height 7.6 cm) (initial weight E=20 g). Then the total weight (wire gauze+initial weight E=$E_1$ in g) is determined. The filled gauze is suspended for 20 minutes in a water-filled glass dish such that the sorbent is completely submerged. After 20 minutes the wire gauze is removed from the water and allowed to drip for 20 minutes. Immediately afterwards the weight of the container with the contents is determined ($E_2$ in g). The evaluation is done as follows:

$$\text{Water absorbency in percent} = \frac{E_2 - E_1}{E} \times 100.$$

The water permeability is determined according to the water penetration test as follows.

Water from a 50 ml burette is poured onto a leveled and uncompacted bed of the granular sorbent in a glass dish (diameter 140 mm, height 75 mm, fill level 50 mm) and the penetration depth is observed. In doing so the burette is discharged at a level of 3 to 4 cm into the center of the bed, whereupon 60 ml of tap water are allowed to run out within 55 to 60 seconds. After waiting 3 minutes the bottom of the dish is checked to determine whether water has run through. Whether the water has run through can be detected by coloration of the granular material on the bottom of the dish. Evaluation is done as follows:

coloration on the bottom of the dish not visible: test passed;

coloration on the bottom of the dish visible: test failed.

The bulk weight is determined as follows:

A 500 ml graduated cylinder is first weighed empty. Then a powder funnel with an opening of roughly 15 cm and an outlet opening of roughly 3 cm is seated on it and filled within roughly 5 seconds with the granular sorbent. Afterwards the powder funnel is removed from the graduated cylinder, such that the granular material located therein forms a projecting cone. The latter is scraped off with a wide spatula along the ground edge of the graduated cylinder. Adhering grains or dust are removed from the outside of the filled graduated cylinder which is weighed again. The bulk weight is computed as follows:

Bulk weight (g/l)=2×net weight (g/500 ml)

The invention is explained by the following examples in a nonrestricted manner.

EXAMPLE 1

Roughly 1.95 kg of dried calcium bentonite (drying temperature 120° C., drying duration 1 hour) with a water content of roughly 7% by weight were intensively mixed for 5 minutes with 0.55 kg of a recovered paper stock of 27.5% by weight cellulose, 27.5% by weight inorganic pigments and 45% by weight water as well as 0.3 kg of calcium sulfate hemihydrate. Power consumption was 60 Wh/kg. The mass was compressed at a pressure of 180 kN and the pieces were crushed into a granular material with an average size of 1 to 5 mm. The granular material had high strength, i.e., no dust formed during transport and filling.

The bulk weight, water absorbency, water content (free water) and water permeability (penetration test) of the granular material obtained as well as its capacity to form lumps are given in the table.

EXAMPLE 2

1.95 kg of dried sodium bentonite (drying temperature 120° C., drying duration 1 hour) with a water content of roughly 11% by weight were intensively blended for roughly 5 minutes in a forced mixer with 0.55 kg of a recovered paper stock according to Example 1 and 0.3 kg of calcium sulfate hemihydrate. The mixture was compacted according to Example 1 and crushed in a jaw crusher. The fraction from 1 to 5 mm was screened out. No dust formed during transport and filling of the granular material.

The properties of the granular material are listed in the table.

EXAMPLE 3

1.5 kg of calcium bentonite dried according to Example 1, with a water content of 7% by weight were intensively mixed 0.75 kg of a recovered paper stock according to Example 1 and 0.75 kg of calcium sulfate hemihydrate. The mixture was compacted according to Example 1 and crushed. The fraction from 1 to 5 mm was screened out. No dust formed during transport and filling of the granular material. The properties are listed in the table.

EXAMPLE 4

1.95 kg of calcium bentonite, dried according to Example 1, with a water content of 7% by weight are intensively mixed for 5 minutes with 0.55 kg of the recovered paper stock from Example 1 and 0.3 kg of anhydrous calcium sulfate (anhydrous gypsum lumps). The mixture was compacted according to Example 1, crushed and screened. The fraction from 1 to 5 mm was used. The granular material formed no dust during transport and filling.

TABLE

|  | Example 1 | Example 2 | Example 3 | Example 4 |
| --- | --- | --- | --- | --- |
| Bulk weight | 896 | 860 | 885 | 890 |
| Water absorbency | 136 | 202 | 122 | 136 |
| Composition of final product (%) | | | | |
| Recovered paper stick (DM)* | 10.9 | 10.9 | 13.6 | 10.9 |
| Bentonite (DM)* | 65.0 | 62.0 | 46.5 | 64.8 |
| $CaSO_4 \times 2H_2O$ | 12.7 | 12.7 | 25.2 | 13.6 |
| Free $H_2O$ | 11.4 | 14.4 | 10.0 | 10.8 |
| $H_2O$ bound total | 13.4 | 16.4 | 14.7 | 13.6 |
| Penetration test | passed | passed | passed | passed |
| Lump formation | good | good | good | good |

*Dm = Dry Matter

The table shows that the material with sodium bentonite from Example 2 has the highest water absorbency. But also the materials according to Examples 1, 3 and 4 still have very high water absorbency. All samples passed the penetration test and showed good lump formation.

We claim:

1. A process for producing sorbents based on smectites for absorbing liquids, comprising mixing together (a) a smectite with a water content of less than about 6% by weight;

(b) a wet mass of fibrous cellulose and inorganic pigments which forms during the treatment of waste water from paper manufacture; and (c) calcium sulfate, wherein the calcium sulfate is selected from a group consisting of anhydrous calcium sulfate and calcium sulfate hemihydrate, and compressing and crushing the mixture to form a granular material, wherein the quantitative ratio between the smectite, the wet mass and calcium sulfate is selected such that the water content of the granular material is less than 20% by weight.

2. The process of claim 1, wherein the smectite, the wet mass and the calcium sulfate are blended under intensive mixing.

3. The process of claim 1, wherein the wet mass has a water content from about 30 to 60% by weight.

4. The process of claim 1, wherein the wet mass has a water content from about 40 to 50% by weight.

5. The process of claim 1, wherein the ratio of the smectite to the wet mass to the calcium sulfate relative to a respective dry mass is about 2 to 4:1:0.5 to 3.

6. The process of claim 1, wherein the ratio of the smectite to the wet mass to the calcium sulfate relative to a respective dry mass is about 2.5 to 3.5:1:1 to 2.

7. The process of claim 1, wherein the smectite is an alkali earth bentonite.

8. The process of claim 1, wherein the smectite is an alkali bentonite.

9. The process of claim 1, wherein the calcium sulfate is obtained from gypsum.

10. The process of claim 1, wherein the mixture is crushed such that a screened fraction of the granular material from roughly 0.1 to 10 mm is obtained.

11. The process of claim 1, wherein the mixture is crushed such that a screened fraction of the granular material from roughly 1.0 to 5.0 mm is obtained.

12. A sorbent produced according to the process of claim 1.

13. The sorbent of claim 12, which contains about 38 to 71% by weight smectite, 9 to 24% by weight of the wet mass and 5 to 30% by weight calcium sulfate dihydrate, and 5 to 20% by weight free water.

14. The sorbent of claim 12, which contains about 49 to 60% by weight smectite, 13 to 19% by weight of the wet mass and 10 to 20% by weight calcium sulfate dihydrate, and 10 to 15% by weight free water.

15. The sorbent of claim 12, wherein its water absorbency of the granular material is at least about 100%.

16. The sorbent of claim 12, wherein its water absorbency of the granular material is at least about 120%.

17. The sorbent of claim 12, wherein organic sorbents are added to the mixture.

18. The sorbent of claim 12, wherein white pigments, disinfectants or animal acceptance agents are added to the mixture.

* * * * *